(12) United States Patent
Sakata

(10) Patent No.: US 6,353,185 B1
(45) Date of Patent: Mar. 5, 2002

(54) GROMMET AND METHOD OF INSTALLING SAID GROMMET ON A PANEL

(75) Inventor: Tsutomu Sakata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/714,197

(22) Filed: Nov. 17, 2000

(30) Foreign Application Priority Data

Nov. 18, 1999 (JP) .......................................... 11-328370

(51) Int. Cl.<sup>7</sup> ................................................ H02G 3/18
(52) U.S. Cl. .............................. 174/65 G; 174/152 G; 174/153 G; 16/2.1
(58) Field of Search .............................. 174/65 G, 151, 174/152 G, 153 G, 135; 248/56; 16/2.1, 2.2

(56) References Cited

U.S. PATENT DOCUMENTS

| | | | |
|---|---|---|---|
| 4,797,513 A | | 1/1989 | Ono et al. |
| 5,453,579 A | * | 9/1995 | Cohea .................... 174/153 G |
| 5,531,459 A | * | 7/1996 | Fukuda et al. .......... 174/153 G |
| 5,732,440 A | | 3/1998 | Wright |
| 5,736,677 A | * | 4/1998 | Sato et al. ................ 174/65 G |
| 5,739,475 A | * | 4/1998 | Fujisawa et al. ........ 174/153 G |
| 5,856,635 A | * | 1/1999 | Fujisawa et al. ........ 174/153 G |
| 5,981,877 A | | 11/1999 | Sakata et al. |
| 6,088,874 A | * | 6/2000 | Nakata et al. ................ 16/2.1 |
| 6,088,875 A | * | 6/2000 | Ono et al. ..................... 16/2.2 |

FOREIGN PATENT DOCUMENTS

| | | | |
|---|---|---|---|
| JP | 5-32159 | 4/1993 | |
| JP | 5-50629 | 7/1993 | |
| JP | 6-231643 | * 8/1994 | .............. 174/153 G |
| JP | 11-25786 | * 1/1999 | ................ 174/65 G |
| JP | 11-311374 | * 11/1999 | .............. 174/152 G |

* cited by examiner

*Primary Examiner*—Dean A. Reichard
*Assistant Examiner*—Angel R. Estrada
(74) *Attorney, Agent, or Firm*—Greenblum & Bernstein, P.L.C.

(57) ABSTRACT

A grommet is provided with a small diameter tube portion which receives a wire harness therein in a fitted condition, and is provided with an enlarged diameter tube portion which continues in a generally conical tube shape from one end of the small diameter tube portion. A recessed portion for hooking on an automobile body panel is provided on an outer peripheral surface of the enlarged diameter tube portion. The height of first and second peripheral side walls on opposite sides of the bottom surface of the recessed portion is established so that the height of the second side wall of the small diameter tube portion side in the opposite side is about 50% to 35% of the height of the first side wall of the opening end side of the enlarged diameter tube portion side. Furthermore, the width dimension of the recessed portion between the first side wall and second side wall is greater than the height dimension of the second side wall, and the second side wall deforms inwardly into the recessed portion. Thus, the grommet can be easily installed in a single push-in motion of the grommet into the penetration hole of the automobile body panel.

17 Claims, 6 Drawing Sheets

GROMMET AND METHOD OF INSTALLING SAID GROMMET ON A PANEL

BACKGROUND OF THE INVENTION

1. Field of the Invention

The present invention relates to a grommet which is installed on a wire harness for an automobile and mounted in the penetration hole of an automobile body panel, and to a method of installing the grommet in the panel.

2. Background of the Invention

When a wire harness is wired from the engine compartment of an automobile to passenger compartment, a grommet 1 made of a rubber or an elastomer is conventionally mounted on the outside of the wire harness W/H, as shown in FIG. 6 and FIGS. 7(A)–(C). Water proof properties and dust proof properties for preventing the invasion of water, dust and the like through the penetration hole 3 from the engine compartment side to the passenger compartment are imparted by inserting the wire harness W/H provided with the grommet 1 into the penetration hole 3 of the automobile panel 2 which separates the engine compartment (X) and the passenger compartment (Y) and mounting the grommet 1 around the peripheral edge of the penetration hole 3.

The grommet 1 is provided with a small diameter tube portion 1a into which the wire harness W/H is inserted in a fitted condition, and is provided with an enlarged diameter tube portion 1b which continues in a conical tube shape from one end of the small diameter tube portion 1a. A recessed portion 1c for hooking on the automobile is provided on the outer peripheral surface of the enlarged diameter tube portion 1b. The recessed portion 1c is inserted into the penetration hole 3 of the automobile body panel 2 to install the grommet 1 on the automobile body panel 2. The thickness of the portion where the recessed portion 1c for hooking on the automobile body panel is provided increases in order to enhance the hooking force at installation, and the recessed portion 1c is made deeper. In other words, the height from the bottom surface 1d of the recessed portion 1c to the edges of both of the side walls 1e and 1f is increased.

For example, as shown in FIG. 6, the depth H1 of the peripheral wall 1e in the edge opening side is set at 8.6 mm, and the depth H2 of the peripheral wall 1f at the edge of the portion 1g, where the peripheral face is slanted while increasing in thickness from the small diameter tube portion in the opposite side, is set at 6.1 mm. Further, the dimension L1 from the peripheral wall 1e in the edge opening side to the opening edge 1h is set at 9 mm, and the dimension L2 of the sloping portion in the opposite side is set at 16.6 mm.

As shown in FIG. 7, the grommet 1 is conventionally inserted from the enlarged diameter tube portion side 1b, from the engine compartment (X) to the passenger compartment (Y) through the penetration hole 3. The entire grommet 1 is first pushed into the passenger compartment (Y) while inwardly deforming the outer peripheral portion containing the recessed portion 1c, which is larger than the inner diameter of the penetration hole 3. Then, the wire harness W/H is pulled back toward the engine compartment (X), and the recessed portion 1c is mounted in the penetration hole 3 to install the grommet 1 on the automobile body panel 2. Namely, the installation of the grommet 1 on the automobile body panel 2 is carried out by two motions, i.e., by first pushing the grommet into the passenger compartment (Y) from the engine compartment (X) and then pulling it back into the engine compartment. The reason why the recessed portion 1c is mounted in the automobile body panel 2 by first pushing the grommet into the passenger compartment and then pulling it back again is that the peripheral wall of the penetration hole 3 cannot be smoothly and positively mounted in the recessed portion 1c between the peripheral wall 1f having a smaller depth when the grommet is pushed in from the peripheral wall 1e having a greater depth.

With the recent rapid increase in parts mounted in an automobile, parts are arranged on both sides of the automobile body panel 2 where the above-mentioned grommet 1 is installed. When the grommet 1 is installed on the automobile body panel 2 as described above, and the entire grommet 1 is first pushed into the car passenger compartment from the engine compartment side., it becomes difficult to provide sufficient space for accepting the grommet when pushed into the passenger compartment. Further, although the grommet must be pulled back into the engine compartment after pushing it into the passenger compartment, there is also little or no space available in the engine compartment for carrying out the work of pulling the grommet back into the engine compartment side.

The wire harness W/H is required to be wired from the engine compartment into the passenger compartment from the engine compartment (X) to the passenger compartment (Y) through the penetration hole 3 of the automobile body panel 2, due to requirements of the construction of the automobile and the like. However, as described above, the problem occurs such that the installation method of the grommet by the two motions of pushing it in and pulling it back into the engine compartment, as shown in FIGS. 7(A)–(C) using the grommet 1 of FIG. 6, cannot be adopted due to lack of space.

SUMMARY OF THE INVENTION

The present invention was developed considering the above-mentioned problem, and an object is to provide a grommet having a construction such that the grommet can be positively inserted and hooked in the penetration hole of an automobile body panel by a single push-in motion from the engine compartment side, and another object is to provide an installation method for the grommet.

In order to solve the above-mentioned problems, the present invention includes a grommet made of a rubber or an elastomer and is provided with a small diameter tube portion in which a wire harness is inserted in a fitted condition, an enlarged diameter tube portion which continues in a conical tube shape from one end of the small diameter tube portion, and a recessed portion for hooking on an automobile body panel. The recessed portion is provided about the outer peripheral surface of the enlarged diameter tube portion. Furthermore, the height of first and second peripheral walls on opposite sides of the bottom face of the recessed portion is established so that the height of the second side wall of the small diameter tube portion side is about 50% to 35% based on the height of the first side wall on an opening edge side of the enlarged diameter tube portion side. Moreover, the width of the recessed portion between the first side wall and the second side wall is set to be greater than the height dimension of the second side wall, and the second side wall is deformable inwardly into the recessed portion.

The height of the second side wall is more preferably about 45% to 40% based on the height of the first side wall, and the height of the second side wall is preferably about 70% to 60% of the width of the recessed portion. Further, the height of the second side wall is about 70% based on the height of the first side wall in comparison with the conventional grommet shown in FIG. 6, and is about 70% to 100% in either of the grommets conventionally provided. Also, the height of the second wall is larger than the width of the recessed portion in the conventional grommet shown in FIG. 6.

Further, in the grommet of the present invention, the axial length of the sloping portion of the second side wall is about 90% to 40% of the axial length of the first side wall to the opening end of the enlarged diameter tube portion, and preferably is about 85% to 70%. In comparison, the axial length of the sloping portion is 150% to 200% in the conventional example shown in FIG. 6.

Further, the second side wall of the grommet of the present invention slopes toward the first side wall from the bottom face side to the upper edge side, and a groove portion is provided on the inner peripheral surface of the enlarged diameter tube portion at a position where the second side wall protrudes from the outer peripheral face of the enlarged diameter tubular portion. The second side wall can easily slope toward the recessed portion side by forming the above shape.

Furthermore, a lip protrudes at the outer edge and from an intermediate portion of the first side wall, and a lip also protrudes at the bottom face of the recessed portion. When the lips are thus formed on the first side wall and the bottom face of the recessed portion, the coherence of the peripheral edge of penetration hole of the automobile body panel fitted in the recessed portion can be enhanced, and the sealing properties can be improved.

In another aspect of the present invention, a method of installing the above-mentioned grommet is provided. The grommet is inserted into the penetration hole having a burring of the automobile body panel, from the small diameter tube portion side. The second side wall is deformed inwardly into the recessed portion by engagement with the burring, and by passing the second side wall through the penetration hole of the automobile body panel. The second side wall is then restored after passing through the penetration hole, so that the peripheral edge of the penetration hole of the automobile body panel is received within the recessed portion between the first side wall and the second side wall, whereby the grommet is installed on the automobile body panel with only a single push-in motion.

Specifically, the grommet is pushed into the penetration hole having a burring from the engine compartment to the passenger compartment on the automobile panel, from the small diameter tube portion side, and is installed on the automobile body panel by only a single push-in motion.

As described above, the grommet can be passed through the penetration hole by only pushing the second side wall to deform inwardly the same because the height of one peripheral wall (the second side wall) of the recessed portion on the insertion side of the automobile body panel to the penetration hole is reduced. Since the height of the first side wall is at least double or more, a moderate sense of feel occurs, and the grommet can be positively hooked by a single push-in motion. Accordingly, even if there is no space on both the engine compartment side and the passenger compartment side, the installation of the grommet on the automobile body panel can be carried out without any difficulty.

Further, the above-mentioned sloping portion continues to the second side wall and is continued to the linear position of the small diameter tube portion side which is at about the same elevation as the bottom surface of the recessed portion. Since the outer diameter of the sloping portion is larger than the inner diameter of the penetration hole, it is necessary to reduce the diameter of the second side wall by deformation when the second side wall is passed through the penetration hole. Therefore, the length of the sloping portion decreases by a half or more in comparison with the length of the sloping portion of a conventional grommet, and the height is also decreased by about a half. Accordingly, the second side wall is very easily deformed inwardly during insertion into the penetration hole. In other words, the second side wall is easily bent. As a result, workability can be improved because a smaller operational force during pushing in is required.

Furthermore, with respect to the hooking retention force against the automobile body panel, the second side wall is restored to an original condition from a inwardly deformed condition by bending from the bottom face side of the recessed portion during installation in the penetration hole, and is hooked on the peripheral edge of the penetration hole. Thus, since it becomes a nearly locked condition, a hooking retention force similar to a conventional one can be obtained even though the height of the second side wall is reduced.

According to another aspect of the present invention, a grommet is configured for installation in an aperture by a single push-in motion. The grommet includes a small diameter tube portion through which a wire harness is extendable in a tightly interfitted condition, an enlarged diameter tube portion including a conical tube portion is connected to one end of the small diameter tube portion, and a recessed portion is provided for hooking in the aperture. The recessed portion is provided about an outer peripheral surface of the enlarged diameter tube portion, and includes a first peripheral side wall on an opening edge side of the enlarged diameter tube portion and a second peripheral side wall on an opposite side of a bottom surface of the recessed portion and on the small diameter tube portion side. Furthermore, a height of the second side wall is smaller than a height of the first wall, and a width of the recessed portion between the first and second walls is greater than the height of the second wall, and the second side wall is deformable inwardly into the recessed portion during installation.

In other aspects of the present invention, the grommet may be configured so that the height of the second wall is about 50% to 35% of the height of the first side wall. Additionally, the second side wall may include a sloping portion, extending from an upper edge of the second side wall, that reduces in diameter from the height of the second wall to about the same level as the position of a bottom surface of the recessed portion, and an axial length of the sloping portion may be about 90% to 40% of an axial length of the first side wall to an opening end of the enlarged diameter tube portion.

In a further aspect of the present invention, the grommet may be configured so that the second side wall includes a sloping portion that slopes upwardly toward the first side wall side from the small diameter tube side to an upper edge of the second side wall, and a groove portion may be provided on an inner peripheral surface of the enlarged diameter tube portion at a position where the second side wall protrudes from an outer peripheral face of the enlarged diameter tubular portion.

According to another aspect of the present invention, a method of installing a grommet is provided. The grommet includes a small diameter tube portion through which a wire harness is extendable in a tightly interfitted condition, an enlarged diameter tube portion including a conical tube portion connected to one end of the small diameter tube portion, and a recessed portion for hooking in the aperture. The recessed portion is provided about an outer peripheral surface of the enlarged diameter tube portion, and the recessed portion includes a first peripheral side wall on an opening edge side of the enlarged diameter tube portion and a second peripheral side wall on an opposite side of a bottom surface of the recessed portion and on the small diameter tube portion side. The recess is configured so that a height of the second side wall is smaller than a height of the first wall, and a width of the recessed portion between the first and second walls is greater than the height of the second wall, and the second side wall is deformable inwardly into the recessed portion during installation. The method includes installing the grommet on a wire harness, inserting the grommet into a penetration hole having a burring, from the small diameter tube portion side, deforming the second side wall inwardly into the recessed portion by pushing the second side wall with the burring, and passing the second side wall through the penetration hole, and restoring the second side wall after passing through the penetration hole so that the peripheral edge of the penetration hole is received in the recessed portion between the first side wall and the second side wall, whereby the grommet is installed in the penetration hole with only a single push-in motion.

The method of installing the grommet may also include configuring the grommet so that the height of the second wall is about 50% to 35% of the height of the first side wall. Additionally, the second side wall may include a sloping portion, extending from an upper edge of the second side wall, that reduces in diameter from the height of the second wall to about the same level as the position of a bottom surface of the recessed portion, and an axial length of the sloping portion may be about 90% to 40% of an axial length of the first side wall to an opening end of the enlarged diameter tube portion.

In a further aspect of the present invention, the method of installing the grommet may also include configuring the grommet so that the second side wall includes a sloping portion that slopes upwardly toward the first side wall side from a the small diameter tube side to an upper edge of the second side wall, and a groove portion may be provided on an inner peripheral surface of the enlarged diameter tube portion at a position where the second side wall protrudes from an outer peripheral face of the enlarged diameter tubular portion.

DETAILED DESCRIPTION OF THE PREFERRED EMBODIMENTS

Figure 1:
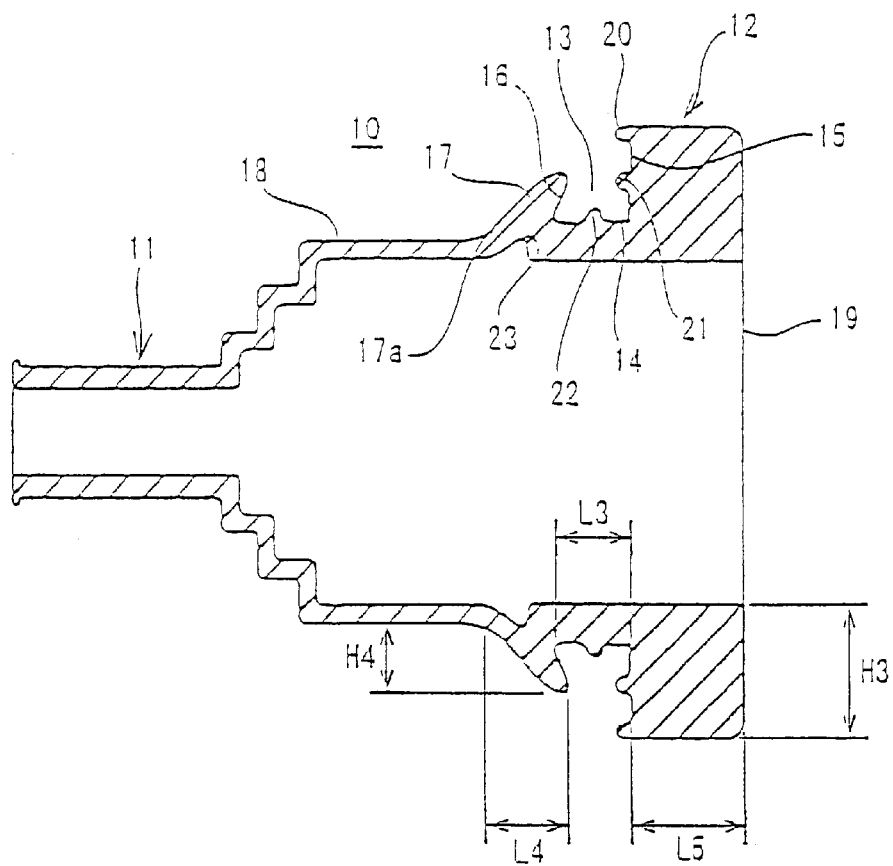
FIG. 1 is a sectional view of the grommet according to one embodiment of the present invention.

The operation of embodiments of the present invention is illustrated below, referring to drawings.

FIG. 1 to FIG. 4 show the first embodiment of the present invention. A grommet 10 is made, for example, of a rubber or an elastomer, and is provided with a small diameter tube portion 11 through which a wire harness, W/H is inserted in an installed condition. An enlarged diameter tube portion 12 continues in a conical tube shape from one end of the small diameter tube portion 11, and a recessed portion 13 is provided on an outer peripheral surface of the enlarged diameter tube part 12 for hooking on the automobile body.

Of the two peripheral side walls on opposite sides of the bottom face 14 of the portion 13, the height H4 of the second side wall 16 on the small diameter tube portion side is about 50% of the height H3 of the first side wall 15 on the opening edge side of the enlarged diameter tube portion side. Further, the width L3 in the axial direction of the bottom face 14 of the recessed portion is larger than the height H4 of the second side wall 16 (L3>H4), and the second side wall 16 configured to slope toward the recessed portion 13.

The enlarged diameter tube portion 12 where the above-mentioned recessed portion 14 is provided continues to the second side wall 16, and the portion extending from the small diameter tube portion side becomes the sloping portion 17, the thickness of which gradually thins. A generally cylindrical portion 18 having a thin homogeneous thickness and being coaxial to the axial direction of the grommet continues from the small diameter end of the sloping portion 17. A generally conical shape is formed by forming a plurality of steps while reducing the diameter of similar cylindrical portions in order (see FIG. 1), and the reduced diameter end of the smallest step continues to the small diameter tube portion 11. The outer diameter of the edge 17a on the small diameter tube portion side of the sloping part 17 nearly coincides with the outer diameter of the bottom face 14 of the recessed portion 13. On the other hand, the thickness of the edge opening 19 side of the enlarged diameter tube portion 12 is at least twice the thickness of the second side wall 16 from the first side wall 15 to the edge opening 19.

The length L4 in the axial direction from the second side wall 16 to the edge 17a of the sloping portion about 83% of the length L5 in the axial direction from the first side wall 15 to the edge opening 19 of the enlarged diameter tube portion.

Figure 2:
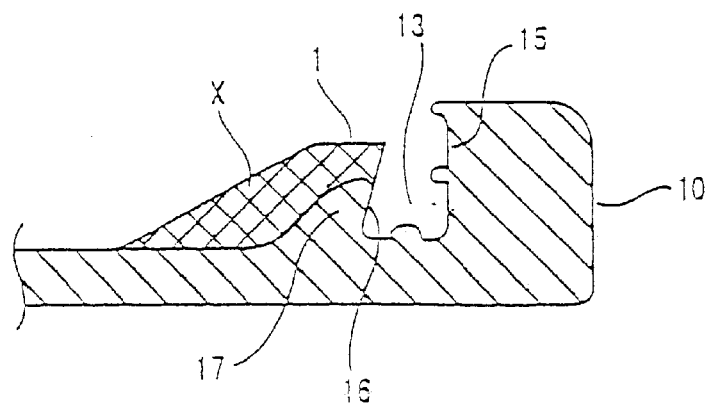
FIG. 2 is a sectional view showing the relationship between the grommet of FIG. 1 and a conventional grommet.

As shown in FIG. 2, the grommet 10 of the present invention is configured to eliminate a shaded portion X in comparison to the sloping portion of the second side wall of a conventional grommet 1, thereby reducing the height of the second side wall 16 and also reducing and shortening the sloping portion 17. Namely, the height of the second side wall 16 is reduced by about 43% in comparison to the conventional one, and the length of the sloping portion 18 is reduced by about 55% in comparison to the conventional grommet.

Further, in the grommet 10, the second side wall 16 slopes toward the first side wall side 15 from the bottom face 14 of the recessed portion 13 to the outer edge side, and forms a lip shaped edge. Further, circumferential lips 20, 21 protrude from the outer edge side and from the intermediate portion of the first side wall 15, and a peripheral lip 22 also protrudes at the central portion of the bottom face 15 of recessed portion 13. Furthermore, the second side wall 16 is provided with a ring-shaped groove portion 23 on the inner peripheral surface of the enlarged diameter tube portion 12 corresponding to a position where the second side wall 16 protrudes from the outer peripheral face. Thus, the second side wall 16 is easily deformed.

Figure 3:
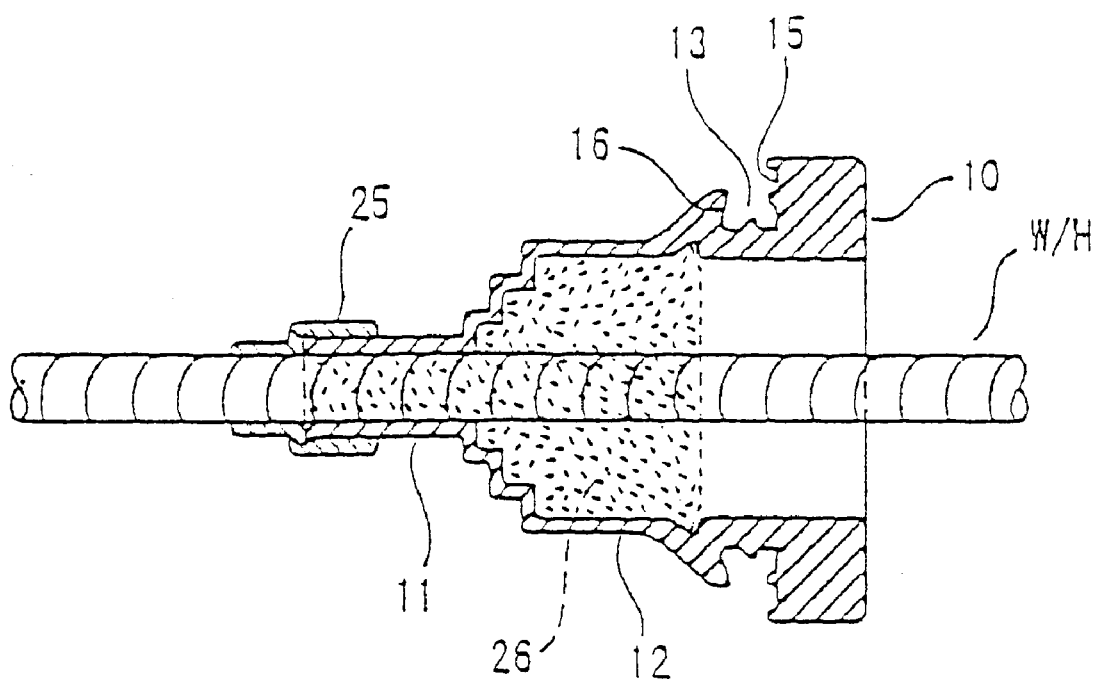
FIG. 3 is a sectional view showing the condition in which the grommet of FIG. 1 is installed on a wire harness.
Figure 4A:
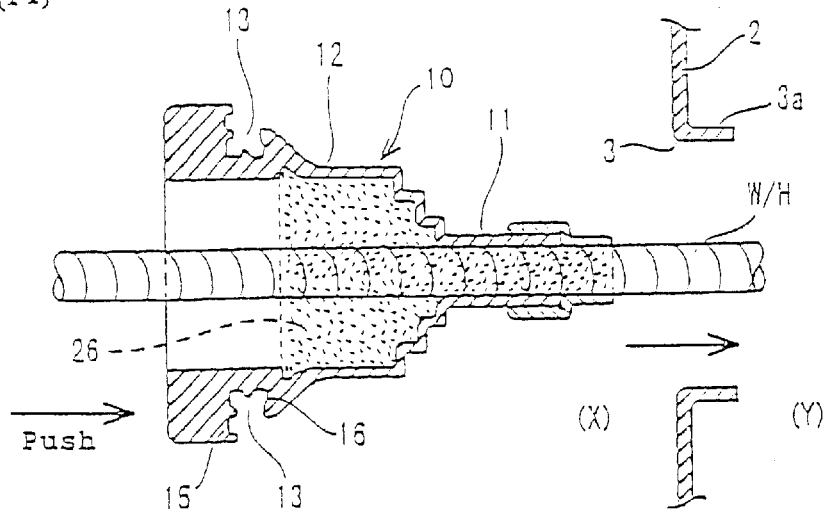
FIG. 4(A) to FIG. 4(D) show the operations of passing the grommet installed on the wire harness through the penetration hole of the automobile body panel and hooking the grommet on the body panel.
Figure 4B:
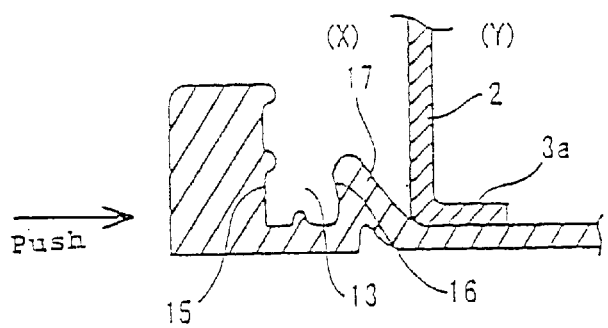
Figure 4C:
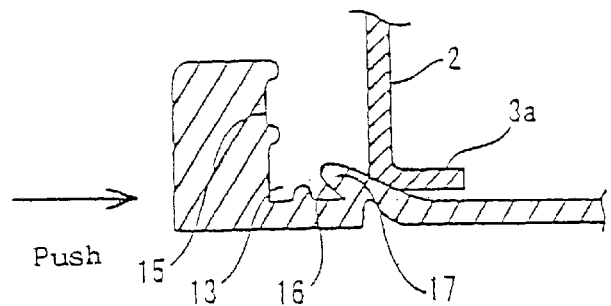
Figure 4D:
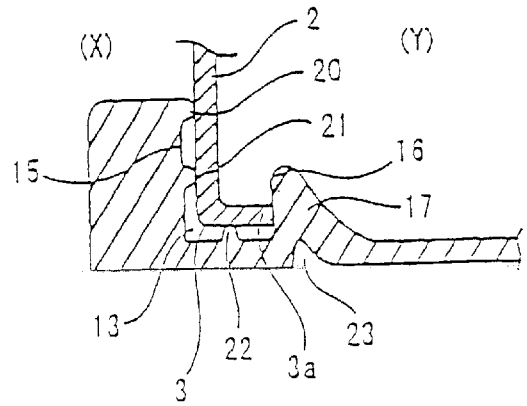

As shown in FIG. 3, the grommet 10 having the above-mentioned shape receives the wire harness W/H in a condition in which the small diameter tube portion 11 is expanded using an expanding jig (not illustrated), and which extends from the edge opening 19 of the enlarged diameter tube portion 12. Tape 25 is wrapped on the outer end of the small diameter portion 11 and the wire harness W/H. Under this condition, a suitable sealant 26 is filled within the grommet 10.

When the wire harness W/H provided with the grommet 10 is wired in an automobile, it is inserted from the engine compartment (X) to the passenger compartment (Y) through the penetration hole 3 of the automobile body panel 2, as shown in FIG. 4(A) to FIG. 4(D). The burring 3a protrudes toward the passenger compartment (Y) around the peripheral rim of said penetration hole 3. Alternatively, the burring may protrude toward the engine compartment side (X).

As illustrated, the grommet 10 installed on the wire harness W/H is installed so that the insertion side is the small diameter tube portion 11. Therefore, the grommet is inserted into the penetration hole 3 from the small diameter tube portion side. When the grommet reaches the sloping portion 17 of the enlarged diameter tube portion 12 upon insertion, the sloping portion 17 passes through while being deformed inwardly by pushing due to its gradual taper relative to the penetration hole 3 and the inner diameter of the burring 3a. When the second side wall 16 engages the burring 3a, the second side wall 16 can be passed into the penetration hole 3 and the burring 3a without a large operational force because the second side wall deforms inwardly into the recessed portion 13 as illustrated.

When the second side wall 16 passes the edge of the burring 3a, the burring 3a and the panel 2 at the peripheral edge of the penetration hole 3 reach a condition in which they move into the gap between the second side wall -16 and the first side wall 15, and are hooked in the recessed portion 13. At this time, the protruding amount of the first side wall 15 is nearly twice that of the second side wall 16, and since the thickness from the first side wall 15 to the opening edge 19 is large, a moderate sense of feel occurs when the first side wall 15 comes into contact with the panel 2, and a worker can easily recognize that the grommet 10 has been hooked on the panel 2.

As described above, the grommet 10 can be inserted into the penetration hole 3 and hooked in place by a single push-in motion of the grommet 10 mounted on the wire harness W/H from the engine compartment side. Accordingly, the installation work of the grommet become easy in comparison with the conventional two required motions of pushing and then pulling. Thus, the installation work of the grommet can be carried out without difficulty even if there is no space in the passenger compartment side and the engine compartment side.

Figure 5:
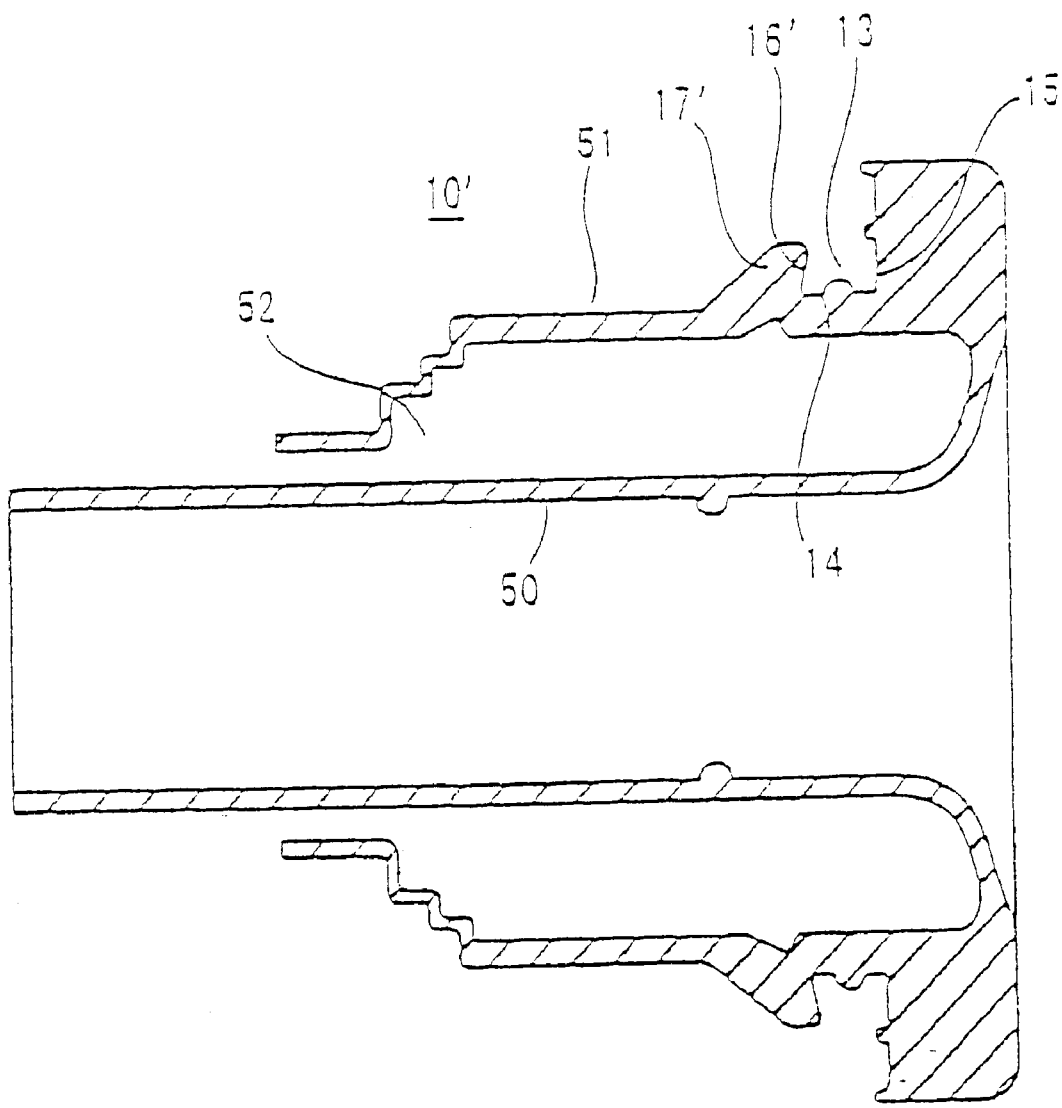
FIG. 5 is a sectional view showing a second embodiment of the present invention.
Figure 6:
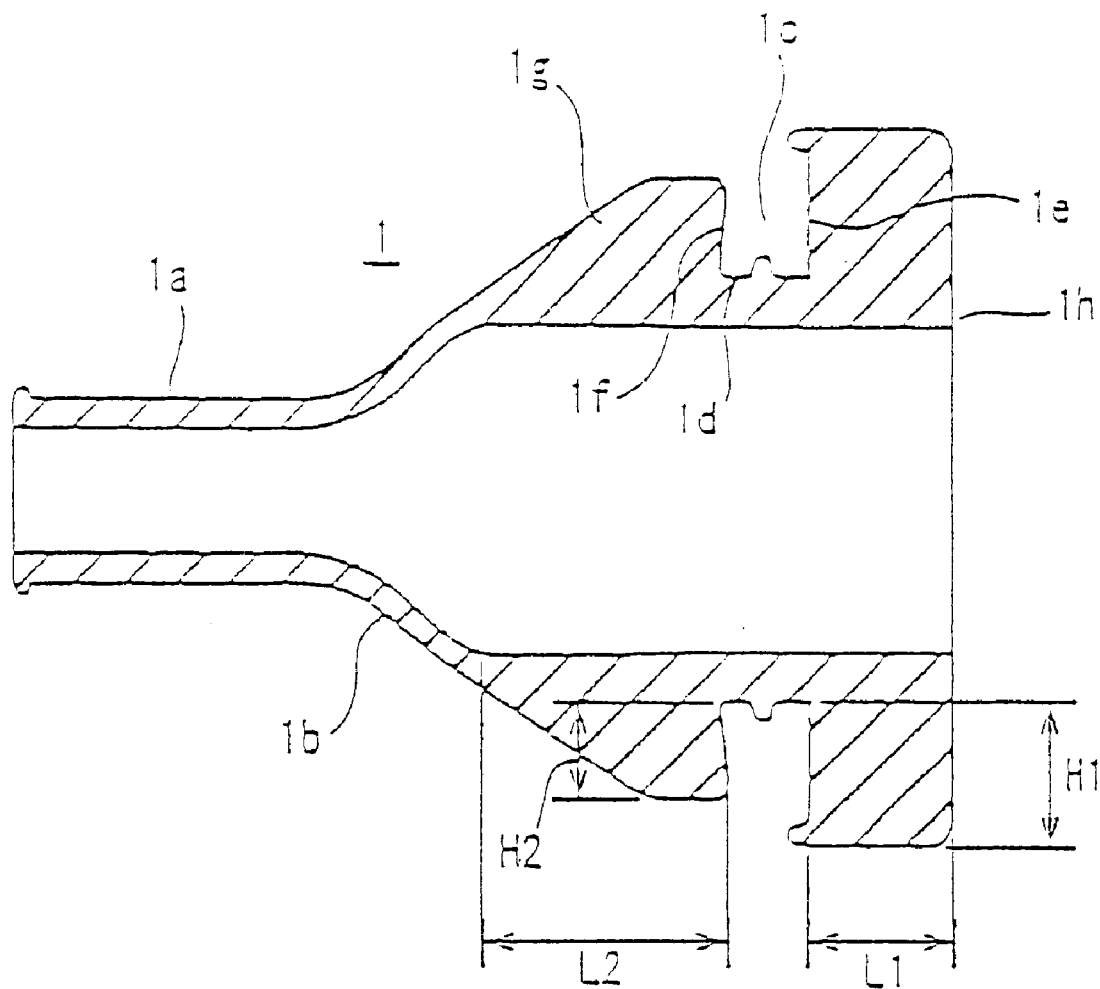
FIG. 6 is a sectional view showing a conventional grommet.
Figure 7A:
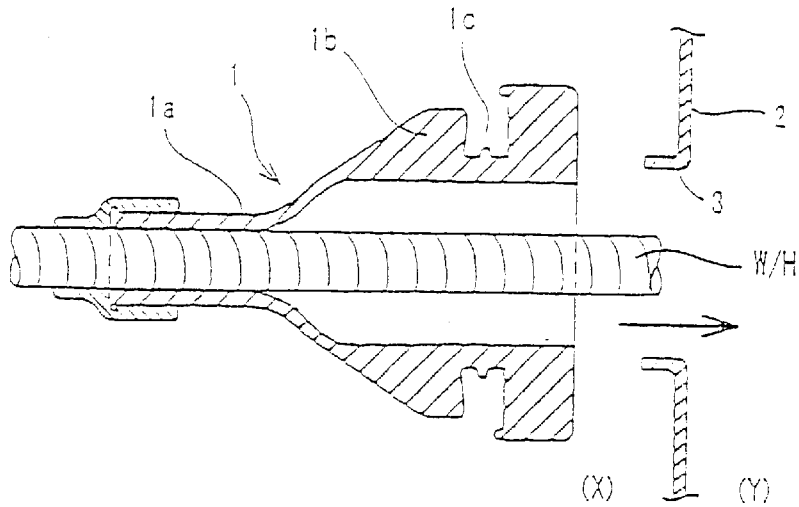
FIG. 7(A) to FIG. 7(C) show the operations of passing a conventional grommet through the penetration hole of the automobile body panel and hooking the grommet on the body panel.
Figure 7B:
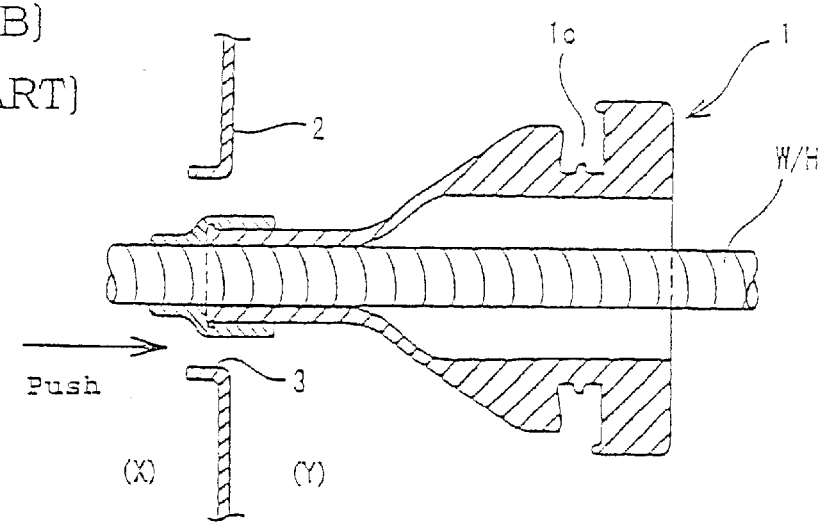
Figure 7C:
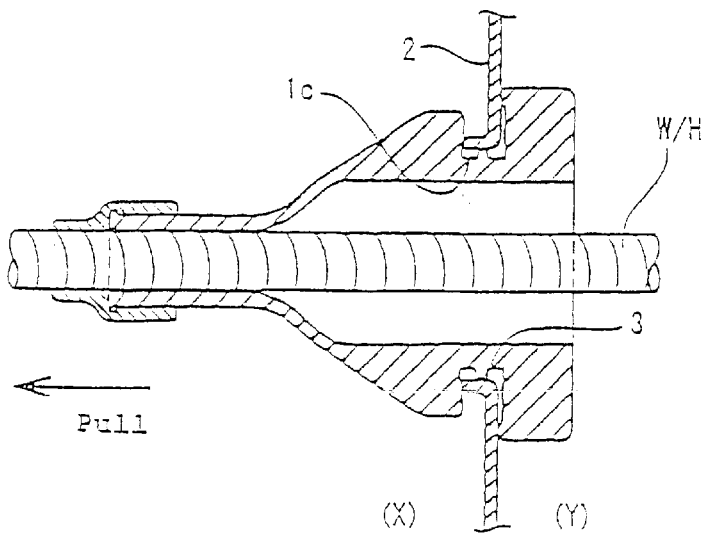

FIG. 5 shows a modified embodiment. The enlarged diameter tube portion 12' of the grommet 10' is formed by double walls including an inner wall 50 and an outer wall 51, and sound-proof properties are enhanced by providing a clearance 52 between the inner wall 50 and the outer wall 51. Further, as -the second side wall 16' and the sloping portion 17' are provided on the outer wall 51. the thickness is reduced in comparison with the first embodiment, therefore the second side wall 16' and the sloping portion 17' can be more easily deformed, and the movement of the penetration hole into the recessed portion at installation can be smoothly carried out. Further, as the other construction of the grommet of FIG. 5 is the same as in the first embodiment, illustration is abbreviated by utilizing the same reference numerals for like elements.

As is clear from the description above, in the grommet of the present invention, since the height of the second side wall at the smaller diameter tube portion side of the recessed portion for hooking on the automobile body panel is reduced and the second side wall can deform inwardly into the recessed portion, the panel can be smoothly and positively hooked between the second side wall and the first side wall on the opposite side of the recessed portion when the second side wall is passed through the penetration hole of the automobile body panel.

Thus, the installation of the grommet can be smoothly carried out even if there is no space around the installation position of the grommet, because the grommet can be hooked on the penetration hole of the automobile body panel by a single push-in motion of only pushing the grommet into the penetration hole. Further, the grommet has advantages that the ease of installation of the grommet can be improved and the like, because it is sufficient to merely push the grommet in a single motion.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 11-328370, filed on Nov. 18, 1999, which is herein expressly incorporated by reference in its entirety.

What is claimed:

1. A grommet formed of one of a rubber and an elastomer and provided with a small diameter tube portion through which a wire harness extends in a tightly interfitted condition, an enlarged diameter tube portion which continues in a conical tube shape from one end of said small diameter tube portion, and a recessed portion for hooking on an automobile body panel, said recessed portion being provided about an outer peripheral surface of said enlarged diameter tube portion, wherein a height of first and second peripheral side walls on opposite sides of a bottom surface of said recessed portion is established so that the height of said second side wall of a small diameter tube portion side of said enlarged diameter tube portion is about 50% to 35% of the height of said first side wall on an opening edge side of said enlarged diameter tube portion, and a width of said recessed portion between said first side wall and said second side wall is set to be greater than the height dimension of said second side wall, and said second side wall is deformable inwardly into said recessed portion during installation; and wherein a groove portion is provided on an inner peripheral surface of said enlarged diameter tube portion at a position where said second side wall protrudes from an outer peripheral face of said enlarged diameter tubular portion, said groove portion extending outwardly toward said second wall to form a reduced thickness portion between said groove portion and said recessed portion to enhance folding of said second wall toward said first wall.

2. The grommet according to claim 1, wherein said second side wall is provided with a sloping portion that reduces in diameter to about the same position as the position of a bottom surface of said recessed portion, from an upper edge of said second side wall, and a length of said sloping portion in an axial direction of said enlarged diameter tube portion being about 90% to 40% of a length in said axial direction between said first side wall and an opening end of said enlarged diameter tube portion.

3. The grommet according to claim 1, wherein said second side wall slopes toward said first side wall side from a bottom face side to an upper edge side.

4. The grommet according to claim 2, wherein said second side wall slopes toward said first side wall side from a bottom face side to an upper edge side, and a groove portion is provided on an inner peripheral surface of said enlarged diameter tube portion at a position where said second side wall protrudes from an outer peripheral face of said enlarged diameter tubular portion.

5. An installation method for a grommet, wherein the grommet according to claim 1 is used, said method comprising:
    installing said grommet on a wire harness;
    inserting said grommet into a penetration hole having a burring of an automobile body panel, from said small diameter tube portion side;
    deforming said second side wall into said recessed portion by pushing said second side wall with the burring, and passing said second side wall through the penetration hole of the automobile body panel;
    restoring said second side wall after passing through the penetration hole so that the peripheral edge of the penetration hole is received in the recessed portion between said first side wall and said second side wall, whereby said grommet is installed on the automobile body panel with only a single push-in motion.

6. An installation method for a grommet, wherein the grommet according to claim 2 is used, said method comprising:
    installing said grommet on a wire harness;
    inserting said grommet into a penetration hole having a burring of an automobile body panel, from said small diameter tube portion side;
    deforming said second side wall into said recessed portion by pushing said second side wall with the burring, and passing said second side wall through the penetration hole of the automobile body panel;
    restoring said second side wall after passing through the penetration hole so that the peripheral edge of the penetration hole is received in the recessed portion between said first side wall and said second side wall, whereby said grommet is installed on the automobile body panel with only a single push-in motion.

7. An installation method for a grommet, wherein the grommet according to claim 3 is used, said method comprising:
    installing said grommet on a wire harness;
    inserting said grommet into a penetration hole having a burring of an automobile body panel, from said small diameter tube portion side;
    deforming said second side wall into said recessed portion by pushing said second side wall with the burring, and passing said second side wall through the penetration hole of the automobile body panel;
    restoring said second side wall after passing through the penetration hole so that the peripheral edge of the penetration hole is received in the recessed portion between said first side wall and said second side wall, whereby said grommet is installed on the automobile body panel with only a single push-in motion.

8. A grommet configured for installation in an aperture by a single push-in motion, said grommet comprising:
    a small diameter tube portion through which a wire harness is extendable in a tightly interfitted condition;
    an enlarged diameter tube portion including a conical tube portion connected to one end of said small diameter tube portion; and
    a recessed portion for hooking in the aperture, said recessed portion being provided about an outer peripheral surface of said enlarged diameter tube portion, said recessed portion comprising a first peripheral side wall on an opening edge side of said enlarged diameter tube portion and a second peripheral side wall on an opposite side of a bottom surface of said recessed portion and on said small diameter tube portion side, wherein a height of said second side wall is smaller than a height of said first wall, and a width of said recessed portion between said first and second walls is greater than said height of said second wall, and said second side wall is deformable inwardly into said recessed portion during installation;
    wherein a groove portion is provided on an inner peripheral surface of said enlarged diameter tube portion at a position where said second side wall protrudes from an outer peripheral face of said enlarged diameter tubular portion, said groove portion extending outwardly toward said second wall to form a reduced thickness portion between said groove portion and said recessed portion to enhance folding of said second wall toward said first wall.

9. The grommet according to claim 8, wherein said height of said second wall is about 50% to 35% of said height of said first side wall.

10. The grommet according to claim 8, wherein said second side wall includes a sloping portion, extending from an upper edge of said second side wall, that reduces in diameter from said height of said second wall to about the same level as the position of a bottom surface of said recessed portion.

11. The grommet according to claim 10, wherein an axial length of said sloping portion is about 90% to 40% of an axial length of said first side wall to an opening end of said enlarged diameter tube portion.

12. The grommet according to claim 8, wherein said second side wall includes a sloping portion that slopes upwardly toward said first side wall side from said small diameter tube side to an upper edge of said second side wall.

13. A method of installing a grommet, said grommet comprising a small diameter tube portion through which a wire harness is extendable in a tightly interfitted condition, an enlarged diameter tube portion including a conical tube portion connected to one end of said small diameter tube portion, and a recessed portion for hooking in the aperture, said recessed portion being provided about an outer peripheral surface of said enlarged diameter tube portion, said recessed portion comprising a first peripheral side wall on an opening edge side of said enlarged diameter tube portion and a second peripheral side wall on an opposite side of a bottom surface of said recessed portion and on said small diameter tube portion side, wherein a height of said second side wall is smaller than a height of said first wall, and a width of said recessed portion between said first and second walls is greater than said height of said second wall, and said second side wall is deformable inwardly into said recessed portion during installation, and a groove portion is provided on an inner peripheral surface of said enlarged diameter tube portion at a position where said second side wall protrudes from an outer peripheral face of said enlarged diameter tubular portion, said groove portion extending outwardly toward said second wall to form a reduced thickness portion between said groove portion and said recessed portion to enhance folding of said second wall toward said first wall, said method comprising:

installing said grommet on a wire harness;

inserting said grommet into a penetration hole having a burring, from said small diameter tube portion side;

deforming said second side wall inwardly into said recessed portion by pushing said second side wall with the burring, and passing said second side wall through the penetration hole;

restoring said second side wall after passing through the penetration hole so that the peripheral edge of the penetration hole is received in said recessed portion between said first side wall and said second side wall, whereby said grommet is installed in the penetration hole with only a single push-in motion.

14. The method of installing the grommet according to claim 13, wherein said height of said second wall is about 50% to 35% of said height of said first side wall.

15. The method of installing the grommet according to claim 13, wherein said second side wall includes a sloping portion, extending from an upper edge of said second side wall, that reduces in diameter from said height of said second wall to about the same level as the position of a bottom surface of said recessed portion.

16. The method of installing the grommet according to claim 15, wherein an axial length of said sloping portion is about 90% to 40% of an axial length of said first side wall to an opening end of said enlarged diameter tube portion.

17. The method of installing the grommet according to claim 13, wherein said second side wall includes a sloping portion that slopes upwardly toward said first side wall side from said small diameter tube side to an upper edge of said second side wall.

* * * * *